US009750079B1

(12) United States Patent
Mitchell

(10) Patent No.: US 9,750,079 B1
(45) Date of Patent: Aug. 29, 2017

(54) HYBRID SATELLITE RADIO SYSTEM

(71) Applicant: Rockwell Collins, Inc., Cedar Rapids, IA (US)

(72) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 97 days.

(21) Appl. No.: 13/746,036

(22) Filed: Jan. 21, 2013

(51) Int. Cl.
*H04W 84/06* (2009.01)

(52) U.S. Cl.
CPC .................................. *H04W 84/06* (2013.01)

(58) Field of Classification Search
None
See application file for complete search history.

(56) References Cited

U.S. PATENT DOCUMENTS

| | | | | |
|---|---|---|---|---|
| 6,201,797 B1* | 3/2001 | Leuca | ............... | H04B 7/18508 370/316 |
| 6,529,706 B1 | 3/2003 | Mitchell | | |
| 6,697,850 B1* | 2/2004 | Saunders | ..................... | 709/219 |
| 6,804,514 B2* | 10/2004 | Wiedeman et al. | .......... | 455/427 |
| 6,941,138 B1* | 9/2005 | Chang et al. | ................ | 455/427 |
| 6,952,580 B2* | 10/2005 | Chang et al. | ................ | 455/427 |
| 7,068,616 B2* | 6/2006 | Chang et al. | ................ | 370/316 |
| 7,103,317 B2* | 9/2006 | Chang et al. | ................ | 455/66.1 |
| 7,280,498 B1* | 10/2007 | Mitchell | ...................... | 370/316 |
| 7,450,901 B2* | 11/2008 | Parkman | ..................... | 455/12.1 |
| 8,010,127 B2* | 8/2011 | Burtner et al. | ............ | 455/456.1 |
| 8,504,019 B2* | 8/2013 | Lynch et al. | ................... | 455/430 |
| 8,570,211 B1* | 10/2013 | Piesinger | ............ | G01S 13/9303 342/29 |
| 2001/0032254 A1* | 10/2001 | Hawkins | ............ | G06F 17/3089 709/219 |
| 2002/0137509 A1* | 9/2002 | Laufer et al. | ................. | 455/427 |
| 2003/0167257 A1* | 9/2003 | de Bonet | ......................... | 707/1 |
| 2007/0283262 A1* | 12/2007 | Pally | ............................ | 715/700 |
| 2008/0263601 A1 | 10/2008 | Hebb et al. | | |
| 2009/0010200 A1* | 1/2009 | Lauer | ................. | H04B 7/18506 370/316 |

(Continued)

OTHER PUBLICATIONS

Nishiyama, H. et al., "Load Balancing and QoS Provisioning Based on Congestion Prediction for GEO/LEO Hybrid Satellite Networks," Proceedings of the IEEE, vol. 99, Issue 11, Nov. 2011, pp. 1998-2007.*

*Primary Examiner* — Donald Mills
(74) *Attorney, Agent, or Firm* — Angel N. Gerdzhikov; Donna P. Suchy; Daniel M. Barbieri

(57) ABSTRACT

An aircraft satellite communications system is provided. The aircraft satellite communications system may include a receiver/transmitter system configured for transmitting and receiving data from a low earth orbit satellite. The low earth orbit satellite is in communication with a host. The low earth orbit satellite is configured for receiving a request from the receiver/transmitter system and communicating the request to the host. The aircraft satellite communications system also includes a receiver configured for receiving data from a geostationary orbit satellite. The geostationary orbit satellite is also in communication with the host and is configured to receive a response to the request from the host and to transmit the response to the receiver.

21 Claims, 4 Drawing Sheets

(56) References Cited

U.S. PATENT DOCUMENTS

2010/0060517 A1\* 3/2010 Nichols ............. H01Q 21/0025
  342/357.29
2012/0016980 A1\* 1/2012 Rothschild ................... 709/224
2012/0194399 A1 8/2012 Bily et al.
2012/0300815 A1\* 11/2012 Tronc ........................... 375/147

\* cited by examiner

HYBRID SATELLITE RADIO SYSTEM

TECHNICAL FIELD

The present disclosure generally relates to the field of aircraft data and communications systems and more particularly to a hybrid satellite radio system.

BACKGROUND

Current systems for providing internet and in-flight entertainment onboard an aircraft may rely upon satellite options that do not provide a desired level of performance. For example, some systems may lack the capacity or bandwidth to support certain applications, such as high speed internet browsing. Similarly, existing systems may not provide such services as efficiently or cost effectively as may be required. In addition, existing systems may require components that are very large and not suitable for all aircraft.

Therefore, there exists a need for improved systems and methods for providing aircraft communications.

SUMMARY

The present disclosure is directed to an aircraft satellite communications system. The aircraft satellite communications system may include a receiver/transmitter system configured for transmitting and receiving data from a first satellite, which may be a low earth orbit satellite. The first satellite is in communication with a host and is configured for receiving a request from the receiver/transmitter system and communicating the request to the host. The aircraft satellite communications system also includes a receiver system configured for receiving data from a second satellite. The second satellite is also in communication with the host and is configured to receive a response to the request from the host and to transmit the response to the receiver system. The second satellite may include a geostationary orbit satellite.

The present disclosure is also directed to a method for providing communications to an aircraft. The method may include the step of receiving a request from a low earth orbit satellite, the request including a requested internet page. A further step of the method includes retrieving the requested internet page. The method also includes the step of transmitting the requested internet page to a geostationary orbit satellite, the geostationary orbit satellite configured to transmit the requested internet page to a receiver system on the aircraft.

The present disclosure is also directed to an aircraft satellite communications system. The aircraft satellite communications system may include a receiver/transmitter system configured for transmitting and receiving data to and from an off-board communications link. The off-board communications link may be in communication with a host. The off-board communications link may be configured for receiving a request from the receiver/transmitter system and communicating the request to the host. The aircraft satellite communications system may also include a receiver system configured for receiving data from a geostationary orbit satellite. The geostationary orbit satellite may be in communication with the host. The geostationary orbit satellite may be configured to receive a response to the request from the host and to transmit the response to the receiver system.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
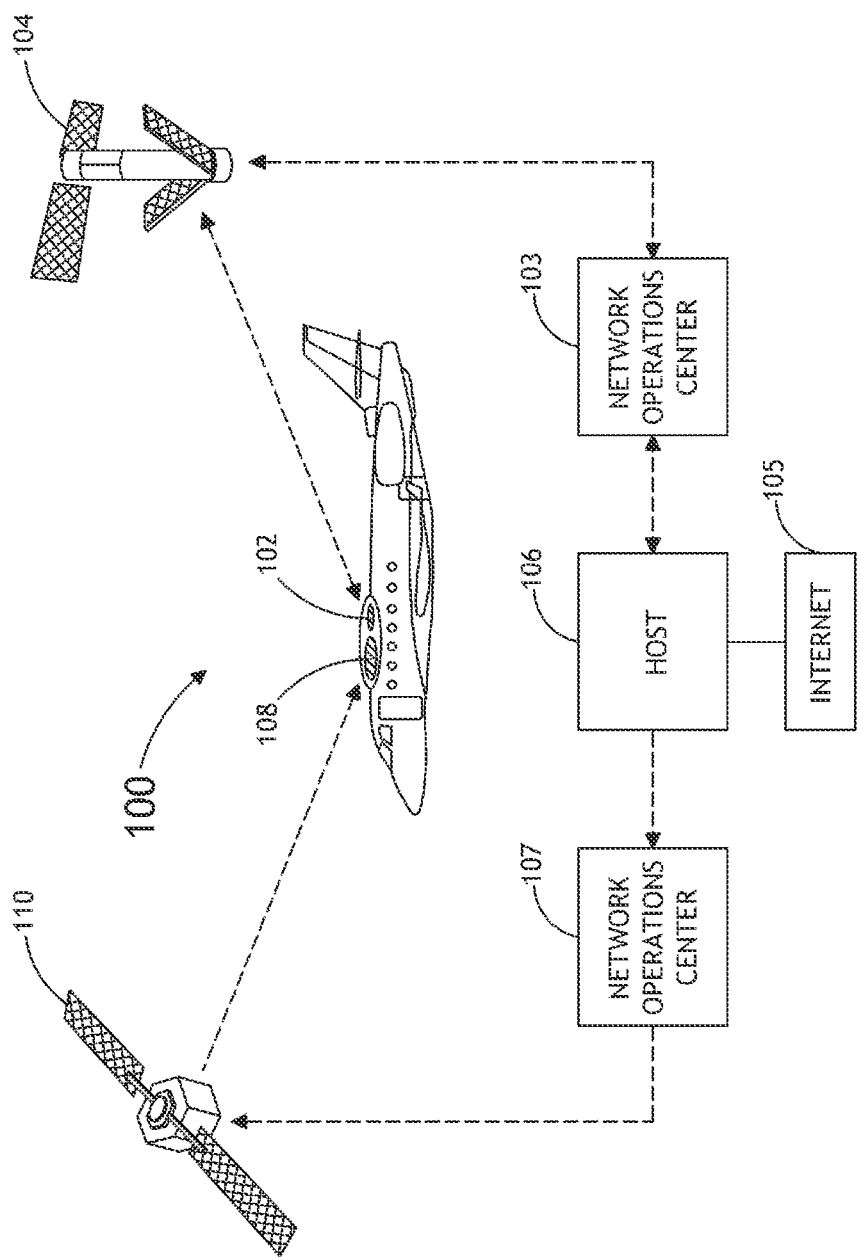
FIG. 1 is a diagram of an aircraft satellite communications system.

Current systems and methods for providing high speed internet and other communications on smaller aircraft may not meet a required level of performance. For example, current systems for providing internet and other communications and entertainment onboard a small to mid-sized aircraft may not provide the speed that is required for high speed internet browsing and other internet applications.

The implementation of communication systems intended for larger aircraft on smaller and mid-sized aircraft may provide the desired internet connection speed, but this approach may present drawbacks. For example, the aircraft communications system may include a transmitter and a receiver for communicating with a geostationary orbit (GEO) satellite. GEO satellites are able to provide the desired connection speed for high speed internet browsing and television and other entertainment. The required antenna for transmitting to a GEO satellite may be very large, including a diameter of up to 30 inches in some cases. The required antenna for receiving signals from a GEO satellite may also be large with a diameter of up to 12 inches or more. The combination of the transmit antenna and the receive antenna in a conventional aircraft communications system may be in the range of 3 feet wide and up to 6 feet long. Placing such a large system on a smaller or mid-sized aircraft having a fuselage in the range of 4.5 feet up to 6 feet can impede aircraft performance. For example, the conventional communications system may cause aerodynamic problems for smaller to mid-sized aircraft and may increase fuel costs. In addition, the communications system may cause the range of the aircraft to be impeded.

The relationship between antenna gain and antenna size may be represented using the following formula:

$$\frac{G}{T} \approx \frac{4\pi(\text{Area of Antenna})}{(\Lambda^2)T}$$

where G represents the gain of the antenna, T represents temperature, and $\Lambda$ represents the wavelength. Thus, antenna's requiring greater gain, such as the gain required to transmit to a geostationary orbit satellite will generally be expected to be larger than antennas having smaller gain requirements.

One solution that has been used to overcome the problems associated with implementing large communications systems onboard small to mid-sized aircraft is to use a different satellite constellation, such as a satellite from a low earth orbit (LEO) satellite constellation. The antennas required to transmit and receive signals from LEO satellites are smaller than those used for GEO satellites, making them easier to implement on smaller and mid-sized aircraft. For example, antennas for transmitting and receiving signals from a LEO satellite may implement an omni patch antenna, rather than the large antennas required for GEO satellite systems. The omni patch antenna used for LEO satellite communications may be approximately 3 inches in one example. However, in general, the connection speed provided by LEO satellite systems is much lower than the connection speed provided by GEO satellite systems and may not be capable of providing high speed internet at desired connection speeds.

In addition, existing systems for providing communications onboard an aircraft may not be able to provide communications across the globe. For example, existing systems may not be functional in certain areas of the globe (including regions beyond 70 degrees latitude such as the North Pole) where GEO satellites may not provide service.

Another problem that may be faced by current systems for providing communications onboard an aircraft relates to the need for a backup system in the event of a communications system failure. For example, some aircraft may require an entirely separate back up system in case the primary system fails.

An additional problem faced by current systems may include limited functionality for use on the ground. For example, existing air to ground communications systems may work when the aircraft is in flight, but may have limited or unpredictable functionality when the aircraft is on the ground or at a lower altitude.

The present disclosure addresses the size problems with GEO satellite communications systems on smaller aircraft and the problems with connection speed associated with LEO satellite communications systems by implementing a hybrid LEO/GEO satellite system approach. In addition, the present disclosure addresses problems with existing systems in providing communications across the globe. Last, the present disclosure provides a system that may still provide communications even if part of the system fails or is otherwise unavailable. The present disclosure also provides a system that is functional when the aircraft is on the ground or in flight.

The hybrid LEO/GEO satellite system approach incorporates the use of both the LEO satellite constellation and the GEO satellite constellation in order to provide a communications system that is small enough to implement on a smaller to mid-sized aircraft, but that provides connection speeds fast enough to enable high speed internet browsing and other communications.

The hybrid LEO/GEO satellite system capitalizes on the difference in size requirements for transmit and receive satellite antennas. Specifically, the antennas required for transmission are typically larger than antennas required for receiving signals in satellite communications systems. One reason for this size difference relates to the need to avoid interference when transmitting to the satellite. The transmitting antenna must be able to provide a narrow enough beam to the satellite that avoids interference with other satellites, which typically requires a larger transmitting antenna. For receiving antennas, it is permissible for the beam to be wider and some degree of interference is generally acceptable, so the antennas may be smaller.

The hybrid LEO/GEO satellite system of the present disclosure replaces the large transmitting antenna typically associated with GEO satellite communications systems with a smaller antenna suited for transmissions to LEO satellites. Although LEO satellites typically provide slower connection speeds than GEO satellites, the LEO satellite antenna may be used primarily for transmitting internet requests. The transmission of internet requests generally involves the transmission of less data than the receipt of the requested internet page, as the internet request may only include a uniform resource locator (URL), whereas the requested URL may include substantially more data such as graphics, text, etc. Therefore, the LEO satellite system may be suitable for providing transmission of internet requests to an off-board host, while facilitating the use of a much smaller transmitting antenna than a GEO satellite system.

Similarly, the hybrid LEO/GEO satellite system of the present disclosure implements a GEO satellite receiver configured for receiving the requested internet page or other information. The GEO satellite receiving antenna is generally much smaller than a GEO satellite transmitting antenna, and is therefore suitable for implementation onboard a smaller to mid-sized aircraft. The use of a GEO satellite receiving system may provide greater connection speed than a LEO satellite receiving system. While the higher connection speed provided by GEO satellites may not be as essential for transmitting internet requests, the larger data quantities associated with the receipt of internet requests requires greater bandwidth and a higher connection speed in order to meet a desired level of performance. The GEO satellite system is able to provide the desired connection rate for high speed internet capabilities.

Therefore, the hybrid LEO/GEO satellite system of the present disclosure is able to provide a system suitable for use onboard a small to mid-sized aircraft that provides a desired connection speed by capitalizing on the different connection speeds required for transmission and receipt of internet requests. Similarly, the hybrid LEO/GEO satellite system of the present disclosure replaces the large transmitting antennas required to communicate with GEO satellites with a smaller LEO satellite transmitting antenna. In addition, the system of the present disclosure may provide communications across the globe. Last, the system of the present disclosure may still provide at least a portion of communications if one element of the system fails or is otherwise unavailable.

Figure 2:
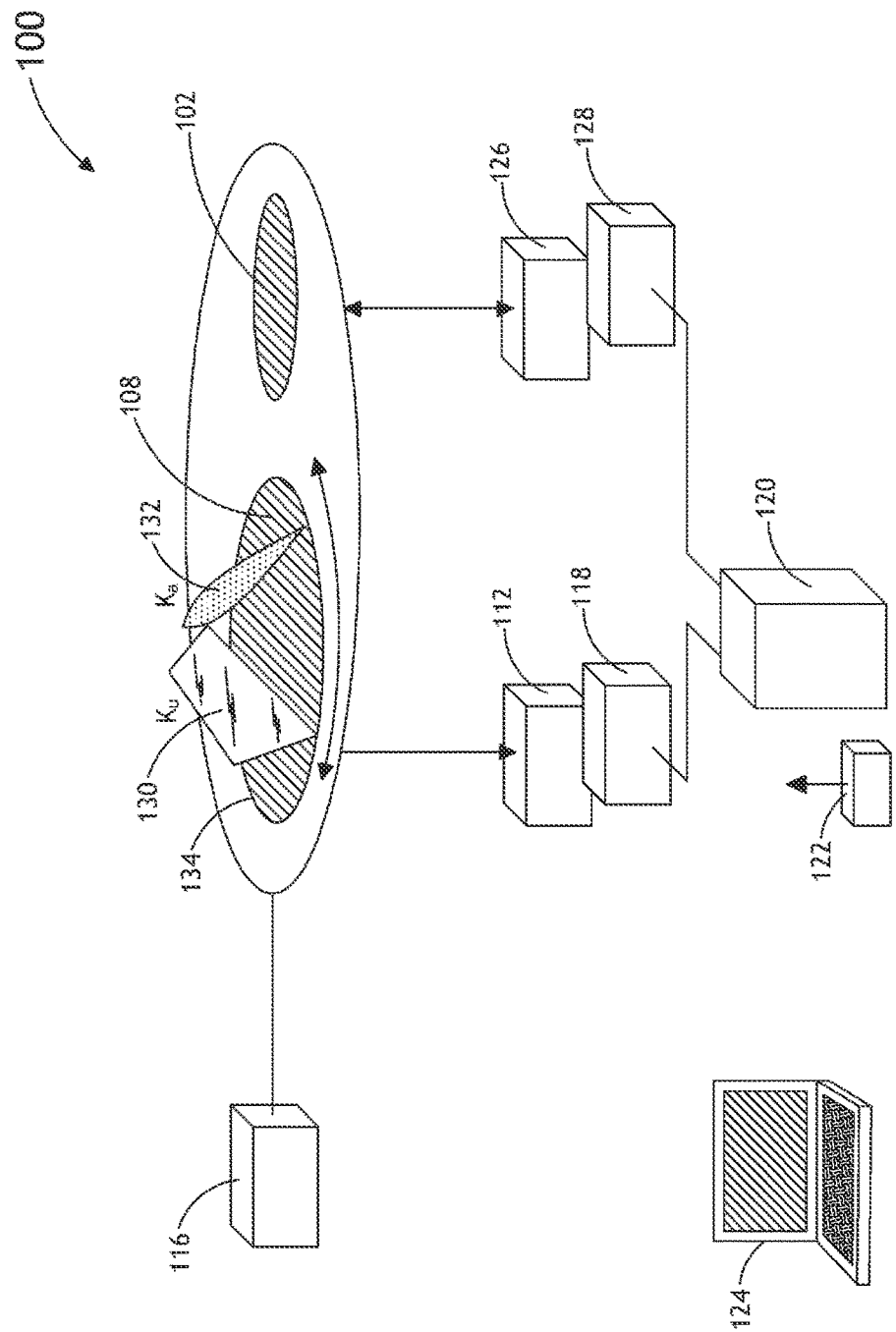
FIG. 2 is a diagram of an aircraft satellite communications system.
Figure 3:
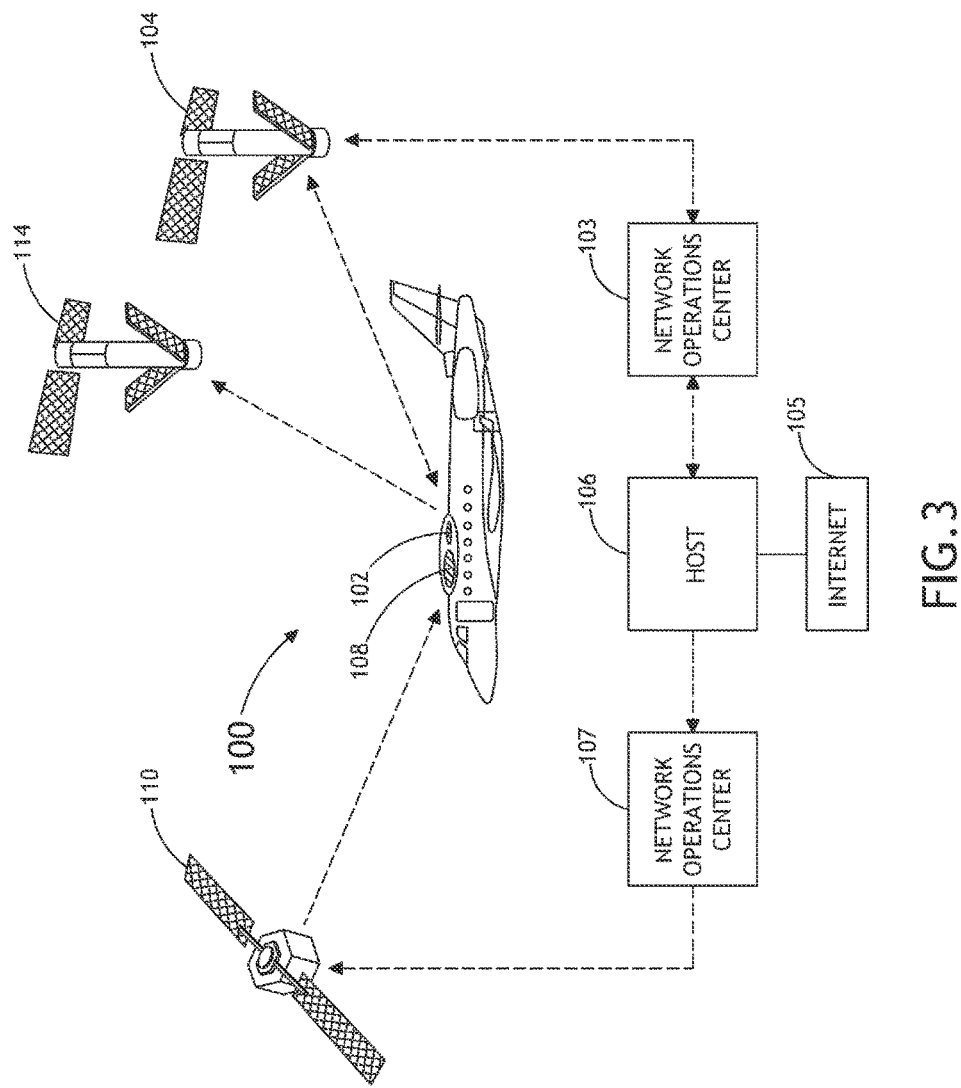
FIG. 3 is a diagram of an aircraft satellite communications system including a first satellite, second satellite, and third satellite.

Reference will now be made in detail to the subject matter disclosed, which is illustrated in the accompanying drawings. Referring generally to FIGS. 1-3, an aircraft satellite communications system 100 is provided. The aircraft satellite communications system 100 may be used to provide a broad range of communications and entertainment onboard an aircraft, including internet broadcast internet, full interactive internet, live television, internet television service, high speed internet service, and voice service, among other communications services. The aircraft satellite communications system 100 may implement a hybrid communications approach in order to improve system latency and facilitate the use of small on-board components suitable for use on an aircraft. In addition, the aircraft satellite communications system may be capable of providing communications across the globe. Last, the aircraft satellite communications system may still provide functionality even if part of the system fails or is otherwise unavailable.

The aircraft satellite communications system 100 may include a receiver/transmitter system 102 configured for transmitting and receiving data from a low earth orbit satellite 104. The low earth orbit satellite 104 may be in communication with a host 106. The low earth orbit satellite 104 may be configured for receiving a request from the receiver/transmitter system 102 and communicating the request to the host 106. The aircraft satellite communications system 100 may also include a receiver system 108 configured for receiving data from a geostationary orbit satellite 110. The geostationary orbit satellite 110 is also in communication with the host 106 and is configured to receive a response to the request from the host 106 and to transmit the response to the receiver system 108.

The low earth orbit satellite 104 of the aircraft satellite communications system 100 shown in FIG. 1 may include any low earth orbit satellite or medium earth orbit satellite. For example, the low earth orbit satellite 104 may include an Iridium or an Iridium NEXT satellite. The low earth orbit satellite 104 may operates in the L band of the electromagnetic spectrum in one embodiment. The low earth orbit satellite 104 may be configured provide two way communication. The low earth orbit satellite 104 may include a particular low earth orbit satellite in one embodiment, or a plurality of low earth orbit satellites in another embodiment.

The geostationary orbit satellite 110 is a different satellite type than the low earth orbit satellite 104. The geostationary orbit satellite 110 may include any geostationary orbit satellite. The geostationary orbit satellite 110 may include a satellite that is configured to transmit in the $K_a$ band of the electromagnetic spectrum (frequencies of approximately 24-40 GHz). In another embodiment, the geostationary orbit satellite 110 may include a satellite that is configured to transmit in the $K_u$ band of the electromagnetic spectrum (frequencies of approximately 10-18 GHz). The geostationary orbit satellite 110 may include a particular geostationary orbit satellite in one embodiment, or a plurality of geostationary orbit satellites in another embodiment.

The receiver system 108 of the aircraft satellite communications system 100 shown in FIGS. 1-3 may be configured to receive frequencies in the $K_a$ band of the electromagnetic spectrum (frequencies of approximately 24-40 GHz). In another embodiment, the receiver system 108 may be configured to receive frequencies in the $K_u$ band of the electromagnetic spectrum (frequencies of approximately 10-18 GHz).

The receiver system 108 of the aircraft satellite communications system 100 may be configured for receiving only in one embodiment. In another embodiment, the receiver system 108 may be configured for both receiving and transmitting communications. The transmission function of the receiver system 108 may be selectively engaged depending on the circumstances. For example, the receiver's transmission function may be turned off or circumvented when other transmission options are available. If there is a lack of transmission options (for example, if the low earth orbit satellite 104 in communication with the receiver/transmitter system 102 is not available), the transmit option for the receiver system 108 may be engaged.

The receiver system 108 may decode and the host 106 may encode using one or more of the following: transmission redundancy, Interleave, rateless erasure codes (for example, Fountain or Tornado), Turbo, Viterbi, Reed Solomon, and forward error connection codes.

In one embodiment, the receiver system 108 may include an electronically steerable array antenna. When the receiver system 108 is implemented as an electronically steerable array antenna, it may be positioned to lay flat against the top of the aircraft fuselage, producing a conformal system where the receiver system 108 is fixed on the fuselage and the beam is steered electronically by the phased array. In other embodiments, the receiver system 108 may include other antenna types, such as a parabolic antenna, VICS antenna, passive array antenna, or other antenna system.

In embodiments where the receiver system 108 includes an electronically steerable array antenna, this may include two electronically steerable array antennas, as shown in FIG. 2. The receiver system 108 may include a $K_u$ band panel 130 and a $K_a$ band panel 132, each mounted on a turning table 134. Each of the $K_u$ band panel 130 and a $K_a$ band panel 132 may be tilted as shown in FIG. 2 to help point the appropriate panel towards the geostationary orbit satellite 110 in one embodiment. In other embodiments, either or both of the $K_u$ band panel 130 and a $K_a$ band panel 132 may be oriented flat against the surface of the aircraft. Similarly, in some embodiments of the system 100, only one panel may be included. The turning table 134 may be used to provide an azimuthal direction to the electronically steerable array antenna and may rotate to point the appropriate panel towards the geostationary orbit satellite 110. When the system 100 is in communication with a $K_u$ band geostationary orbit satellite, the turning table 134 may rotate to orient the $K_u$ band panel 130 towards the geostationary orbit satellite 110, with the $K_a$ band panel 132 oriented away from the geostationary orbit satellite 110. Similarly, when the system 100 is in communication with a $K_a$ band geostationary orbit satellite, the turning table 134 may rotate to orient the $K_a$ band panel 132 towards the geostationary orbit satellite 110, with the $K_u$ band panel 130 oriented away from the geostationary orbit satellite 110. The panel that is not in use at a given time may be switched off or disengaged. The use of an electronically steerable array antenna including a $K_u$ band panel 130 and a $K_a$ band panel 132 may provide flexibility to the aircraft satellite communications system 100 by allowing it to receive communications from either a $K_a$ band or a $K_u$ band geostationary orbit satellite.

The receiver/transmitter system 102 of the aircraft satellite communications system 100 shown in FIGS. 1-3 may include one or more conformal patch antennas in one embodiment. The receiver/transmitter system 102 may also include an omni directional antenna. Advantageously, when the receiver/transmitter system 102 is a conformal patch antenna and the receiver system 108 is an electronically steered array, the system 100 may be suitable for installation on smaller jet aircraft (for example, on light jets, super-mid and mid-sized aircraft).

The low earth orbit satellite 104 and the geostationary orbit satellite 110 may be in communication with a host 106. The host 106 may include a ground-based network operations center capable of providing direct broadcast satellite television programming, internet service, and other data services. The host 106 may be in communication with the internet 105, including the World Wide Web as well as other services such as data services, direct broadcast television program, telephone, and other services, such as facsimile, email, weather, and the like. The system 100 may provide internet, television, voice, and other data services simultaneously in one embodiment.

The low earth orbit satellite 104 and the geostationary orbit satellite 110 may be in communication with at least one network operations center. The network operations centers may be configured for receiving and transmitting communications with their corresponding satellite network as well as an indicated recipient or host. The network operations centers may also be in direct communication with the internet, as well as broadcast and other television and communications providers.

In operation, low earth orbit satellite 104 may transmit the request received from the receiver/transmitter system 102 to a first network operations center 103. The first network operations center 103 may be a ground based service provider associated with the low earth orbit satellite 104 satellite network. The first network operations center 103 may be configured to receive communications from the low earth orbit satellite 104 and to transmit the communication to the host 106.

The host 106 and the geostationary orbit satellite 110 may also be in communication with a second network operations center 107. The second network operations center 107 may be a ground based service provider associated with the geostationary orbit satellite 110 satellite network. The second network operations center 107 may be configured for receiving data from the host 106 and transmitting the communication to the geostationary orbit satellite 110.

The low earth orbit satellite 104 may be configured for receiving a request from the receiver/transmitter system 102 and communicating the request to the host 106. The request may include an internet file request in one embodiment. For example, the request may include a uniform resource locator for a web page.

The request may be indexed in order to reduce the bandwidth required to transmit the request. Indexing of requests may also help to reduce latency in sending requests. Indexing the request may involve replacing an outgoing uniform resource locator string with a unique abbreviated uniform resource locator string or a shortened numerical code. The indexing may be performed by the host 106 or may be performed by a server onboard the aircraft, and then decoded by the host 106.

For example, a 300 character uniform resource locator string may be represented with a 3 character representation or a single numerical code in one embodiment. The indexed request may be computed or determined by the host 106. For example, the host 106 may index all of the uniform resource locators on the requested web page upon receipt of an initial request. The host 106 may then return the indexed pages to the split proxy/link manager 120. For any subsequent request on the same web site, the indexed request may be transmitted instead of the full request. As the host 106 originally determined the indexed pages, the host 106 is able to decode the subsequent indexed requests to the full request.

The indexed request may also be computed or determined by an algorithm implemented by a server onboard the aircraft, such as split proxy/link manager 120 shown in FIG. 2. In that case, the host 106 may be configured with the same algorithm as the onboard system and is able to decode the indexed request to the original request.

The use of indexing may provide advantages by reducing data traffic congestion with the cross switch of the low earth orbit satellite 104 and also by reducing latency in transmitting requests. In some embodiments, indexing may be required in order to provide a required connection speed to the system 100. In other embodiments, the first satellite may be able to provide sufficient connection speed such that indexing is not required. In those embodiments, the requests may not be indexed, or indexing may be used to improve connection speed. Similarly, the requests may be compressed in another embodiment. The host 106 may then be configured to decompress the request to the original request.

The aircraft satellite communications system 100 shown in FIGS. 1 through 3 includes a receiver system 108 configured for receiving data from a geostationary orbit satellite 110. The geostationary orbit satellite 110 is also in communication with the host 106 and receives a response to the request from the host 106 and transmits the response to the receiver system 108. The response may include the requested internet page when the request is a uniform resource locator.

The request may also include the transmission of data and files in one embodiment, such as the transmission of attachments. In some cases, the request may include large amounts of data (for example, one or more oversized files). In one embodiment, when the request includes the transmission of data exceeding a predetermined threshold, the request may be held for transmission until a time when traffic on the low earth orbit satellite 104 is lower. Similarly, when the request includes the transmission of data exceeding a predetermined threshold, the request may be routed to an alternate transmission link. The alternate transmission link may include an alternate satellite network, an air to ground link, a different channel on the low earth orbit satellite 104, or a channel including a plurality of bonded channels of the low earth orbit satellite 104 or other satellite network. The alternate transmission link may be in communication with the host 106 in one embodiment, and the request may be routed to the host 106 via the alternate transmission link. In another embodiment, the request may include an attachment or email and may be routed directly to the recipient through the alternate transmission link, rather than passing through the host 106.

One example implementation of the use of an alternate transmission link is shown in FIG. 3, where an alternate satellite network may be used to transmit the request. The request may be transmitted via a third satellite 114, which may be in communication with the host 106 in one embodiment. In another embodiment, the third satellite 114 may not be in communication with the host 106 and may deliver the data transmission to the indicated recipient. The third satellite 114 may include a satellite that is configured for supporting in-flight communications. In another embodiment, the third satellite 114 may include an air to ground link and would include a ground based communications tower. In one embodiment, the third satellite 114 may include a medium rate data service that may be used to accept data transmissions from an aircraft and forward the data or mail to its respective address.

One or more requests may be transmitted continuously, meaning the request is transmitted off the aircraft as soon as it is received. In another embodiment, requests may be delivered via a Short Burst Data service or a packet data mode. For example, requests may be batched and delivered via a packet data mode such as a Short Burst Data Service. The use of a packet data mode such as a Short Burst Data service to deliver one or more requests to the low earth orbit satellite may reduce latency as the packet data mode may provide a faster connection speed for a particular time period. Similarly, the use of a packet data mode service for transmission of requests may be more cost effective than continuous service in some cases.

An aircraft in flight may switch from one satellite to another satellite based on the satellite coverage of each satellite, the aircraft position, the traffic on a particular satellite, and the cost and availability of different satellites at a given time. Switching of satellites may be done seamlessly without causing any breaks in coverage.

The receiver/transmitter system 102 may include a plurality of receiver/transmitters in one embodiment. For example, a first receiver/transmitter may be used for the transmission of short burst data requests and a second receiver/transmitter may be used to transmit air to ground requests. In one embodiment, an air to ground radio may be used to augment the large file transfer for delivery to long term evolution cellular systems while the aircraft is on the ground, or even when the aircraft is airborne. The use of an air to ground system may provide reduced satellite communications costs. Example air to ground systems may include Aircell or Qualcomm in one embodiment, although any suitable air to ground communication system may be used.

In one embodiment, the aircraft satellite communications system 100 may be configured to implement a pre-fetch or forward cache process. Specifically, the host 106 may be configured to respond to a request from the receiver/transmitter system 102 with at least one additional page in addition to the requested page. The additional page may include the web page corresponding to a uniform resource locator on the same web site as the originally requested web page. For example, if the request includes a request for a specific web page, the host may be configured to provide at least one additional web page associated with the requested web site. The host may also be configured to provide all the embedded web page data behind several additional uniform resource locators for the requested page. This information may be transmitted to the geostationary orbit satellite 110 and the receiver system 108 and then stored in a cache. The cache may include the cache on the user's device, or a cache in an onboard server such as the split proxy/link manager 120.

The use of the forward cache process may help to provide faster internet browsing. For example, when a user clicks on another uniform resource locator on the same web site as the originally requested web page, the web page for the selected uniform resource locator is already in the cache and it is not necessary to transmit the new request and wait for a response through the host 106. The use of this forward cache process may have the advantage of reducing latency in the aircraft satellite communications system 100 and providing faster internet browsing.

The proactive delivery of additional pages in the forward cache process may require additional bandwidth. The geostationary orbit satellite 110 and the receiver system 108 are configured to provide the required bandwidth to implement the forward cache process in one embodiment.

The aircraft satellite communications system 100 may include additional components, as shown in FIG. 2. For example, the receiver/transmitter system 102 may include a radio 126 and a router 128, both in communication with the receiver/transmitter system 102. Similarly, the aircraft satellite communications system 100 may also include a server, such as split proxy/link manager 120 in communication with the radio 126 and the router 128 of the receiver/transmitter system 102. The split proxy/link manager 120 may receive the request through wireless router 122 from a user computer 124, and communicate the request to the receiver/transmitter system 102. The split proxy/link manager 120 may also index the request before communicating it to the receiver/transmitter system 102.

The receiver system 108 may include a programmable receiver 112. The programmable receiver 112 may be configured for receiving the response to the request from the host 106 (via the geostationary orbit satellite 110) and demodulating and error correcting the response. The programmable receiver 112 may also be programmed for a specific satellite or a transponder or transponder channel or logical channel. Similarly, the receiver system 108 may also include a decoder 118 in communication with the programmable receiver 112. The decoder 118 is configured for receiving demodulated signals from the programmable receiver 112 and processing them before delivering the processed data to a user computer 124. The aircraft satellite communications system 100 may also include a positioning system 116.

The user computer 124 may include a laptop computer or other device, such as a personal computer, phone, tablet, or any other device configured for accepting web data and displaying the data as text or graphics. In addition, a plurality of user computers 124 or other devices may be located on the same aircraft and may receive services from the aircraft satellite communications system 100 simultaneously. In addition, the user computer 124 may also include an onboard entertainment system or communication system for the aircraft.

A summary of an example operation of the aircraft satellite communications system 100 is now provided. A client device, such as user computer 124, browses the internet and makes a uniform resource locator request to the aircraft split proxy/link manager 120 via, for example, wireless router 122. The request is conveyed through a router 128 to the radio 126 and communicated to a low earth orbit satellite 104 via receiver/transmitter system 102. The request may include an indexed request. The low earth orbit satellite 104 beams the request (or indexed request, as the case may be) to the host 106. Host 106 receives and processes the request. The host 106 forwards the uniform resource locator request to the internet 105 and the selected web page is returned via the internet 105 to the host 106. In addition, the host 106 may also receive at least one additional web page associated with the selected web page. The host 106 then conveys the response to a geostationary orbit satellite 110. The response may include the requested uniform resource locator only, or the response may include at least one additional web page, or all web pages associated with the requested web page. The host 106 may also index the requested internet page as well as additional pages associated with the requested internet page and return the indexed uniform resource locators with the response. The geostationary orbit satellite 110 beams the response to receiver system 108. The response is then demodulated and error corrected by the programmable receiver 112 and sent to the decoder 118, which delivers the response to a user computer 124. If web pages associated with the selected web page are also included with the response, the additional pages may be stored in a cache on the user computer 124 or on the split proxy/link manager 120.

In one embodiment, the aircraft satellite communications system 100 may be configured to provide onboard services to a plurality of aircraft simultaneously. Each aircraft in the plurality of aircraft would include a receiver and receiver/transmitter onboard. In addition, the aircraft satellite communications system 100 may be used to provide a broad range of communications simultaneously, including for example, high speed internet and television service simultaneously. Additional background regarding the provision of on board communication systems for an aircraft, including simultaneous television and internet service, may be found in U.S. Pat. No. 6,529,706 titled "Aircraft Satellite Communications System for Distributing Internet Service from Direct Broadcast Satellites", which is hereby incorporated by reference.

An aircraft in flight may switch from one satellite to another satellite based on the satellite coverage of each satellite, the aircraft position, the traffic on a particular satellite, and the cost and availability of different satellites at a given time. The aircraft satellite communications system 100 may be configured to provide communications across a wide geographic range where full GEO satellite connectivity may not be available. Similarly, the aircraft satellite communications system 100 may be configured to provide communications if there is a failure in one of the satellite systems. For example, if the aircraft moves out of range of the geostationary orbit satellite 110 (or if the geostationary orbit satellite 110 fails or is otherwise unavailable or less desirable for use at a particular time), the aircraft satellite communications system 100 may be configured to use transmitter/receiver 102 as a backup to both transmit and receive communications from low earth orbit satellite 104, rather than using the hybrid communications approach over the low earth orbit satellite 104 and the geostationary orbit satellite 110. Whether to use the hybrid approach over both the low earth orbit satellite 104 and the geostationary orbit satellite 110 or to switch to the low earth orbit satellite 104 only for transmitting and receiving communications will depend on the circumstances, including the current location of the aircraft, the availability of the geostationary orbit satellite 110 network, cost, bandwidth, and the current connection speeds required at a particular time.

The aircraft satellite communications system 100 may also be configured to provide a hybrid GEO satellite and air to ground based approach. For example, the aircraft satellite communications system 100 may be configured to transmit a request to a communications tower located on the ground, instead of transmitting the request to the low earth orbit satellite. Similarly, the aircraft satellite communications system 100 may be configured to transmit requests to either the low earth orbit satellite or to the ground based communications tower. The communications tower may be in communication with an additional network operations center, as well as the host 106. The air to ground based approach may be implemented on an Aircell link, a Qualcomm link, a $K_u$ band link, the Radar Altimeter Band (approximately 4.2-4.4 GHz), cellular bands including 700 MHz LTE, GSM, WiMax bands, or any other suitable communications network.

The receiver/transmitter system 102 may be used for transmission only, or may be used for both transmitting and receiving. The receive function of receiver/transmitter system 102 may be selectively engaged depending on the circumstances. For example, receiver/transmitter system 102 may be used for receiving indexing information from the host 106, as well as for receiving aircraft information such as weather maps, flight bag information, Notice to Airmen (NOTAM) information, etc., or any other data, including responses to internet requests from the host 106, voice communications, or the like.

The aircraft satellite communications system of the present disclosure may be suitable for implementation onboard an aircraft. In particular, the aircraft satellite communications system of the present disclosure may be suitable for small to mid-sized aircraft, such as a Learjet, a Cessna Citation, a Gulfstream 150, a Gulfstream 250, a Hawker Beechcraft, as a few examples.

Figure 4:
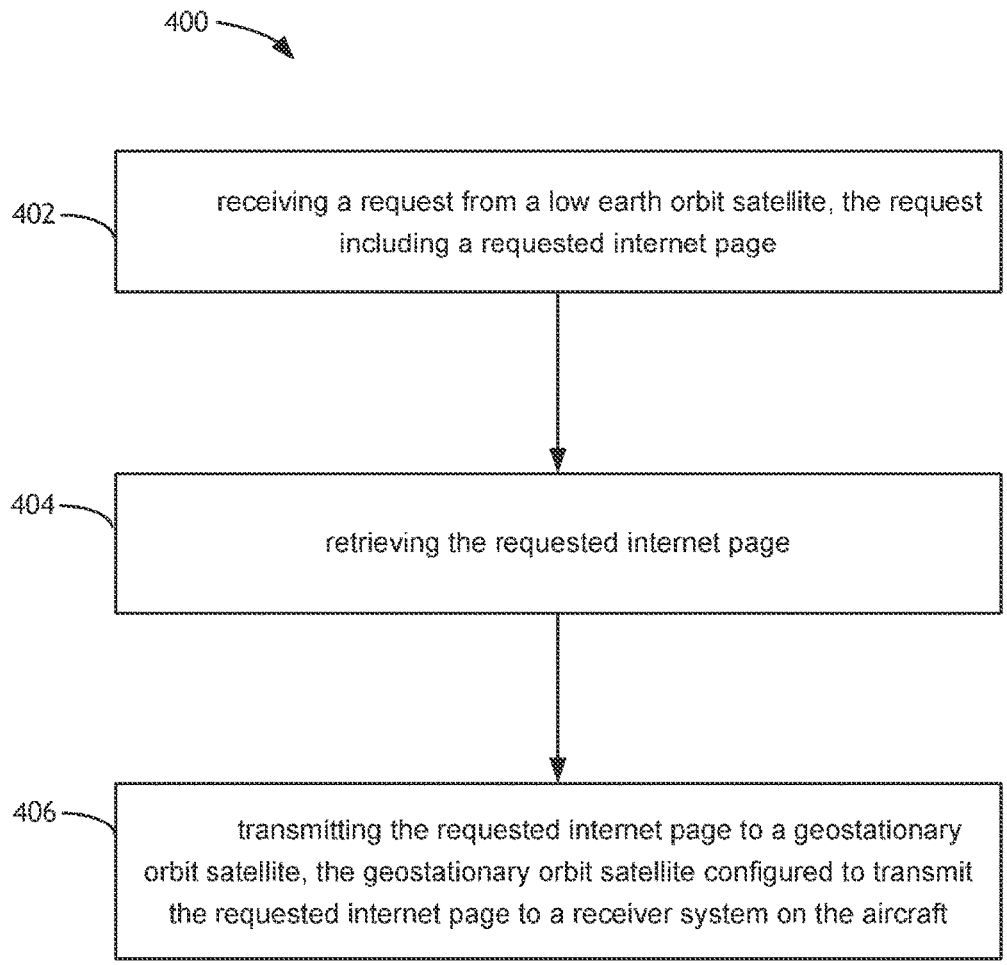
FIG. 4 is a flow diagram of a method for providing communications on board an aircraft.

The present disclosure is also directed to a method 400 for providing communications to an aircraft, as shown in FIG. 4. The method 400 may be implemented by a ground based host in one embodiment, where the host is in communication with a transmitter/receiver system on the aircraft via a low earth orbit satellite. The method 400 may include the step of receiving a request from a low earth orbit satellite, the request including a requested internet page 402. The method 400 may also include the step of retrieving the requested internet page 404. A further step of the method 400 may include transmitting the requested internet page to a geostationary orbit satellite, the geostationary orbit satellite configured to transmit the requested internet page to a receiver system on the aircraft 406.

The request may be provided to the low earth orbit satellite from a receiver/transmitter system on board the aircraft. The request may include an indexed request. The indexed request may include an indexed uniform resource locator for the requested internet page. When the request is indexed, a further step of the method 400 may include decoding the indexed request to obtain a complete uniform resource locator for the requested internet page.

The method 400 may also include an additional step of retrieving at least one additional internet page, the additional internet page associated with the requested internet page. A further step of the method 400 may include transmitting the at least one additional internet page to the geostationary orbit satellite.

The aircraft satellite communications system 100 may be used to provide a broad range of communications and entertainment onboard an aircraft, including internet broadcast internet, full interactive internet, live television, internet television service and streaming, high speed internet service, and voice service, among other communications services. In addition, the aircraft satellite communications system 100 may be capable of providing internet based or broadcast based television in high definition and 3D, including internet and broadcast television meeting Standard Definition Television standards, High Definition Television standards, Ultra High Definition Television standards, and Three Dimensional TV standards.

It is believed that the aircraft satellite communications system of the present disclosure may provide several advantages. For example, the aircraft satellite communications system may enable the use of smaller two way television and internet antenna solutions for smaller aircraft such as business jets. Similarly, the aircraft satellite communications system of the present disclosure may enable a greater range of satellite provider options. For example, the use of a down link only satellite as the second satellite may reduce leasing costs and also provide a greater number of satellite options. In addition, the aircraft satellite communications system of the present disclosure may provide near seamless coverage when traveling in and out of $K_u$ band spot beams using one or more satellite providers. In addition, the aircraft satellite communications system of the present disclosure may take advantage of existing servers and satellite infrastructure and programming. The aircraft satellite communications system of the present disclosure may also be capable of providing communications across the globe.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A hybrid communications system, comprising:
   a vehicle transceiver system comprising a first antenna operating at a first frequency band and at a low connection speed to communicate with a first satellite and transmit an indexed internet request to the first satellite, the first satellite comprising a low earth orbit (LEO) satellite or a medium earth orbit (MEO) satellite configured to transmit the indexed internet request from the LEO satellite or the MEO satellite to an off-board host including a network operations center; and
   a receiver system of the vehicle comprising a second antenna operating at a second frequency band and at a high connection speed to receive communications from a second satellite, the second satellite comprising a geostationary orbit (GEO) satellite that is in communication with the off-board host or the network operations center, the communications received including a response to the internet request from the off-board host or the network operations center that is transmitted to the vehicle from the GEO satellite.

2. The communications system of claim 1, wherein the vehicle comprises a small- to mid-sized aircraft.

3. The communications system of claim 2, wherein the first antenna has a diameter of approximately eight centimeters or three inches.

4. The communications system of claim 1, wherein the first antenna comprises a conformal patch antenna and the second antenna comprises an electronically steered array antenna.

5. The communications system of claim 4, wherein the vehicle comprises an aircraft and the electronically steered array antenna comprises at least one of a $K_a$ band receiver panel and a $K_u$ band receiver panel configured to selectively engage and disengage based on whether a $K_a$ band GEO satellite or a $K_u$ band GEO satellite is in communication with the aircraft, and wherein selectively engaging the panel comprises tilting the panel to point towards a satellite and selectively disengaging comprises orienting or laying the panel flat against a surface of the aircraft.

6. The communications system of claim 1, wherein the indexed internet request comprises a low-bandwidth internet file request transmitted to the first satellite using a representation of a uniform resource locator (URL), meeting requirements of the low connection speed, and wherein the response comprises a high-bandwidth requested internet file transmitted within capabilities of the high connection speed.

7. The communications system of claim 6, wherein the indexed internet request comprises the representation of the URL and the off-board host is configured to decode the representation of the URL to obtain a complete URL for the high-bandwidth requested internet file.

8. The communications system of claim 1, wherein transmitting the indexed request to the first satellite comprises communication via a first transmission link or over a first channel of the first satellite, the system being further configured for communication via an alternate transmission link, the alternate transmission link comprising one of: transmission from the transceiver system to a third satellite at a medium connection speed and transmission via a second channel of the first satellite.

9. The communications system of claim 8, wherein the transceiver system is configured for transmitting the indexed internet request using the alternate transmission link when a data size of the indexed internet request exceeds a predetermined threshold.

10. The communications system of claim 1, wherein the indexed internet request comprises an internet file request and the response comprises the requested internet file and at least one additional internet file transferred simultaneously with the requested internet file.

11. The communications system of claim 1, wherein the indexed internet request is transmitted using a packet data mode service.

12. The communications system of claim 1, further comprising:
   a server, the server in communication with the transceiver system and configured for receiving the internet request from a user computer and further configured for indexing the internet request.

13. A method for receiving communications using a hybrid system, comprising:
   indexing an internet request from a user computer on a vehicle;
   transmitting the indexed internet request from a transceiver system of the vehicle to a first satellite, the first satellite comprising a low earth orbit (LEO) satellite or a medium earth orbit (MEO) satellite, the transceiver system operating at a first frequency band and at a medium or low connection speed and comprising a first antenna;
   transmitting the indexed internet request from the first satellite to a host including a network operations center;
   transmitting a response including data to fulfill the internet request from the host or the network operations center to a second satellite; and
   engaging a high-speed receiver system of the vehicle to receive the data to fulfill the internet request, the receiver system operating at a second frequency band to receive communications from the second satellite, the second satellite comprising a geostationary orbit (GEO) satellite.

14. The method of claim 13, further comprising:
   abbreviating or replacing a uniform resource locator (URL) of the internet request to reduce a bandwidth associated with communicating the internet request;
   decoding the indexed internet request to obtain a complete URL of an internet page associated with the internet request, wherein the internet page is communicated to the vehicle at a high connection speed; and
   indexing the complete URL and any associated URLs on the internet page upon receipt of an initial internet request.

15. The method of claim 14, wherein the internet page is a first internet page, the method further comprising:
   demodulating, error correcting, and decoding the first internet page prior to delivering the first internet page to the user computer; and
   receiving a second internet page from the GEO satellite simultaneous with the first internet page according to a pre-fetch or forward cache process, wherein the second internet page is associated with the first internet page.

16. The method of claim 14, wherein abbreviating or replacing the URL includes at least one of: abbreviating a URL associated with the requested internet page, using a URL associated with the request to generate a shortened numerical code for the requested internet page, and compressing the URL associated with the requested internet page.

17. The method of claim 13, wherein the vehicle comprises an aircraft, the method further comprising:
selectively engaging a receive function of the transceiver system to receive data from the low earth orbit satellite 1) when the data comprises at least one of indexing information, aircraft information, Notice to Airmen (NOTAM) information, low-bandwidth responses to internet requests, and voice communications, or 2) depending on a location of the aircraft, an availability of a GEO satellite network, cost, bandwidth, or a connection speed required for a respective communication.

18. The method of claim 13, wherein the vehicle comprises an aircraft, the transceiver system comprises a first transceiver system, and the receiver system comprises a second transceiver system or a third transceiver system, the method further comprising:
selectively engaging the receiver system for transmitting data when the first transceiver system connected to the aircraft fails or is unavailable for transmitting.

19. The method of claim 13, wherein the vehicle comprises an aircraft and the transceiver system comprises a first transceiver system, the method further comprising:
augmenting the first transceiver system by including a radio or a second transceiver system with the first transceiver system and by further configuring the radio or second transceiver system to transmit large files associated with the internet request using one of: an air to ground frequency band and a long term evolution (LTE) system.

20. A hybrid satellite communications system for small to mid-sized aircraft, comprising:
a transceiver system connected to a small- to mid-sized aircraft to provide low-bandwidth communications between the aircraft, a first satellite, and an off-board host, the first satellite comprising a low earth orbit (LEO) satellite or a medium earth orbit (MEO) satellite, the off-board host comprising a network operations center, and the low-bandwidth communications comprising a data request originating from the aircraft at a first frequency band;
a receiver system connected to the aircraft to provide high-bandwidth ground and in-flight communications between the aircraft, a geostationary orbit (GEO) satellite, and the off-board host or the network operations center, the high-bandwidth communications comprising a response to fulfill the data request, the response comprising data communicated from the host or the network operations center and transmitted to the aircraft from the GEO satellite at a second frequency band.

21. The communications system of claim 20, wherein the transceiver system is a first transceiver system and the communications system is augmented by a second transceiver system, the second transceiver system comprising one of a transceiver system in communication with a third satellite and a radio configured to use an air-to-ground communications link, and wherein the second transceiver system is configured to augment the first transceiver system when large file transfers are associated with the data request.

* * * * *